Jan. 13, 1931. W. S. ELLIOTT 1,788,387
OPERATING MECHANISM
Filed Jan. 20, 1927
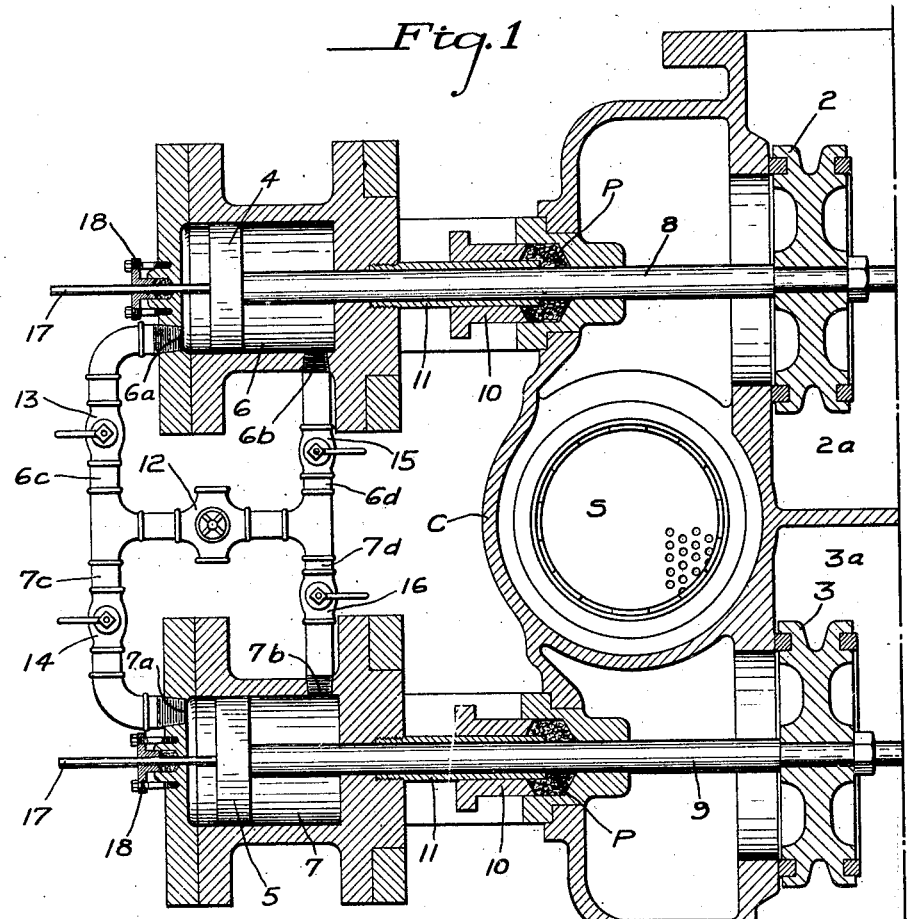
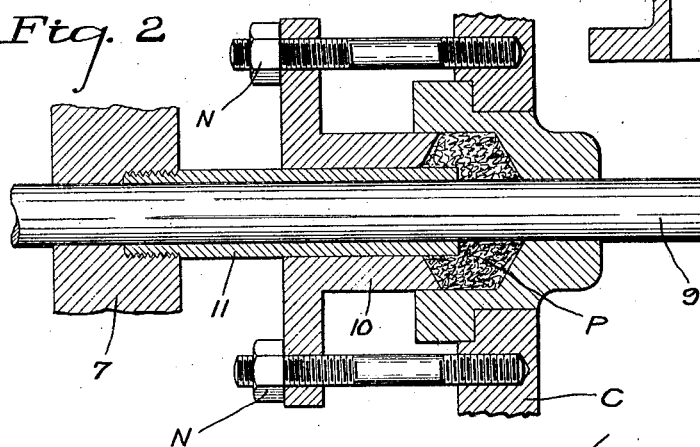
INVENTOR
William S. Elliott
by his attorneys
Byrnes, Stebbins & Parmelee Patented Jan. 13, 1931

1,788,387

UNITED STATES PATENT OFFICE

WILLIAM S. ELLIOTT, OF PITTSBURGH, PENNSYLVANIA

OPERATING MECHANISM

Application filed January 20, 1927. Serial No. 162,303.

This invention relates broadly to operating mechanisms, and more particularly to valve mechanisms operated by fluid pressure.

This invention is particularly adapted for the operation of valves which are disposed within a fluid pressure chamber, such for example as the twin strainer shown in Elliott Patent No. 962,202 of June 21st, 1910.

An important object of this invention is to provide an improved valve operating mechanism whereby a plurality of valves may be simultaneously actuated by fluid pressure.

Another important object of the invention is the provision of common packing means to obviate leakage from either the fluid pressure operating cylinder or the fluid pressure chamber enclosing the valve to be operated.

A further object of the invention is to provide fluid pressure control means whereby the valves may be operated simultaneously, although the friction load is not the same for both fluid pressure operating means.

A still further object of the invention is to provide indicating means whereby the relative positions of the valves may be easily determined.

The accompanying drawings illustrate the present preferred embodiment of my invention, it being understood that the drawings do not define the limits of my invention, as changes may be made therein without departing from the spirit of the invention or the scope of my broader claims.

In the drawings:

Fig. 1 is a sectional plan view showing a portion of a twin strainer embodying my invention; and Fig. 2 is an enlarged detail view of my improved packing means.

According to the present invention, there may be constructed a valve operating mechanism including valves 2 and 3 disposed within fluid pressure chambers $2a$ and $3a$ which are enclosed in a casing C. Valves 2 and 3 are operatively connected to fluid actuated pistons 4 and 5 operable in cylinders 6 and 7. The connection between the valves 2 and 3, and the pistons 4 and 5 may comprise piston rods 8 and 9 which conveniently extend through the ends of the cylinders 6 and 7, into the casing C.

In order to obviate leakage from either the fluid pressure cylinder 6 or 7 or the casing C, I preferably provide a common packing comprising a gland 10 and a tube 11, each tube 11 being secured to the end of the cylinder 6 or 7 and being concentric with its piston rod 8 or 9. The glands 10 may be of the usual type, operating to compress a suitable packing P around and in contact with the piston rod 8 or 9, but each gland 10 is slidable longitudinally in contact with the tube 11 instead of being in contact with the piston rod as is usually done. It will be seen therefore that pressure fluid which may leak around the piston rod 8 or 9 from the cylinder 6 or 7, may travel along the rod within the tube 11, but will be effectively stopped by the packing P which seals the end of the tube. The packing P is, of course, effective for sealing pressure fluid in the casing C by reason of its sealing action against the piston rods. The glands 10 may be moved into compressive engagement with the packing P by suitable nuts N as is well understood in the art.

It will be understood, of course, that the packing may be reversed so that the tubes 11 engage the casing C, and the glands 10 cooperate with a stuffing box on the cylinder end instead of on the casing C as illustrated, without departing from the spirit of my invention.

Operation of the valves 2 and 3 is effected by fluid pressure operating upon the pistons 4 and 5, the pressure fluid being admitted through suitably disposed ports. I preferably provide that each cylinder 6 or 7 be provided with a port $6a$ or $7a$ in the head thereof, and a port $6b$ or $7b$ at the opposite end of the cylinder. Communication may be selectively established between the ports and a fluid pressure source (not shown) through a 4-way valve 12 the valve being connected to the ports $6a$ and $7a$ by conduits $6c$ and $7c$, and to ports $6b$ and $7b$ by conduits $6d$ and $7d$. In order to regulate the fluid pressure admitted to the cylinders, I preferably provide valves 13, 14, 15 and 16 in the conduits $6c$ and $7c$, $6d$ and $7d$ respectively. By suitably adjusting the valves 13, 14, 15 and 16, the fluid pressure admitted to the cylinders 6 and 7 may be divided in any desired ratio, thereby permitting one piston to operate with greater force than the other piston to overcome any greater friction which may be present. For example, if the valve 2 be on the inlet side, the fluid pressure upon the valve 3 may be less than the similar pressure upon the valve 2 by reason of the loss in head occasioned by a strainer (such as S) so that a slightly greater force will be required to move one valve as compared to the other. Again, the friction between the moving parts and in the packing, may not be the same for both valve mechanisms. All of these inequalities in opposition to movement existing between the valve mechanisms may be readily compensated by simply partially closing the valves 13 and 15, or 14 and 16, to permit greater fluid pressure to operate upon the valve mechanism presenting a greater resistance.

Valves 13, 14, 15 and 16 are also useful for initially starting a valve which has become set in place.

Inasmuch as the piston rods 8 and 9 are hidden from view within the tubes 11, there would be no way of telling where the valves are set, if some indicating means were not provided. The indicating device which I prefer comprises rods 17 attached to the pistons 4 and 5 and protruding through the heads of the respective cylinders. These rods are somewhat longer than the stroke of the pistons, so that a portion thereof is always visibly extending beyond suitable packing 18 which prevents leakage from the cylinders. By simply noting the relative positions of the ends of the indicating rods employed, it is possible to readily determine whether or not the valves are operating in harmony.

While I have illustrated and described my invention as applied specifically to the valves of a twin strainer, it will be understood that the invention is not limited to such application, since it may be applied to various other devices wherein a member disposed within a fluid chamber requires definite movement conveniently had through fluid pressure actuating means, and where leakage from the fluid chamber and the fluid actuating means is to be avoided.

In many cases it is desirable in a construction embodying a plurality of separate valve mechanisms or equivalent means to operate each valve or mechanism independently of the others for test purposes, repairs or as a safety measure. With the present arrangement such an operation may be effectively obtained, although under normal conditions the parts move simultaneously or substantially so.

Certain advantages of this invention arise from the provision of a valve operating mechanism adapted to control a valve disposed within the fluid chamber, the actuating force being supplied by fluid pressure means.

Further advantages accrue to my invention by reason of the provision of an improved common packing means whereby leakage is prevented from either the fluid actuating means or the fluid chamber enclosing the valve to be operated.

Still further advantages of my invention arise by reason of the provision of operating mechanism adapted to control a plurality of moving parts, by means of fluid pressure, the fluid pressure being controlled in such way that substantially simultaneous movement of the parts may be effected irrespective of the differences in friction drag, or other forces acting upon them, while at the same time permitting individual operation if desired.

I claim:

1. In a twin strainer, a casing, a plurality of valves disposed within said casing, fluid pressure means for operating the valves, said operating means comprising a piston and cylinder for each valve, means for simultaneously but variably supplying fluid pressure to said fluid pressure means, connecting rods operatively connecting the valves and the pistons, and a single packing means for each cylinder adapted to seal the cylinder and the casing against leakage around the connecting rod.

2. In a twin strainer, a casing, a plurality of valves disposed within said casing on opposite sides of such strainer, fluid pressure means for operating the valves, said operating means comprising a piston and cylinder for each valve, connecting rods operatively connecting the valves and the pistons, a single packing means for each cylinder adapted to seal the cylinder and the casing against leakage around the connecting rod, said packing means including a tube surrounding the connecting rod and engaging the cylinder, packing material adapted to engage the connecting rod and seal the tube and the casing against leakage, a gland adapted to cooperate with the packing material, and means for simultaneously and selectively admitting pressure fluid in variable controlled amounts to opposite sides of the pistons, said fluid admitting means including valved conduits connecting the cylinders to a main control valve.

3. In a twin strainer, a casing, a plurality of valves disposed within said casing, fluid pressure means for operating the valves, said operating means comprising a piston and cylinder for each valve, and means including a main control valve for controlling the pressure fluid admitted to opposite sides of the pistons, said fluid control means comprising at least two valved conduits for each cylinder connecting the cylinders with the main control valve, the main control valve being adapted to admit pressure fluid simultaneously to the cylinders, and the valved conduits being adapted to regulate the pressure admitted to the respective cylinders.

4. In a twin strainer, a casing, a plurality of valves disposed within said casing for controlling the flow of fluid through said strainer, a separate cylinder and piston for controlling each of said valves, means for simultaneously controlling the supply of fluid to and exhaust from said cylinders, and means for individually varying the fluid supply to either cylinder.

In testimony whereof I have hereunto set my hand.

WILLIAM S. ELLIOTT.